Figure 5:
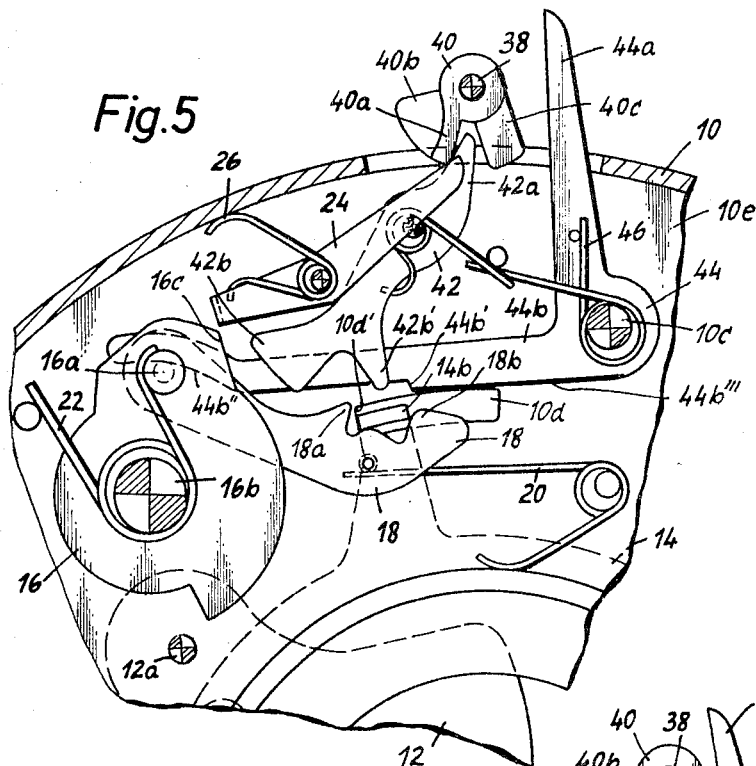

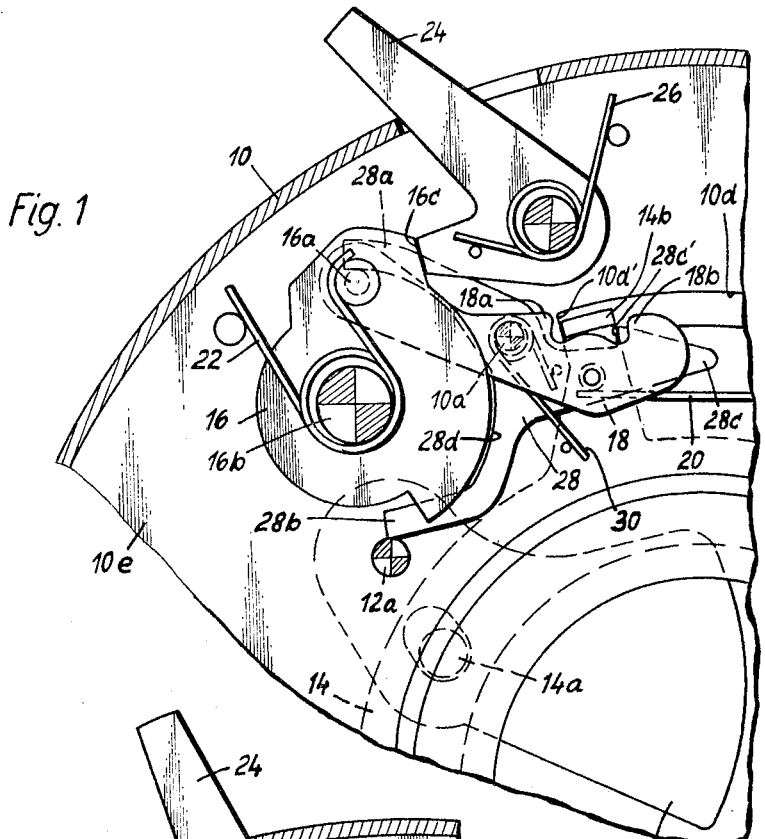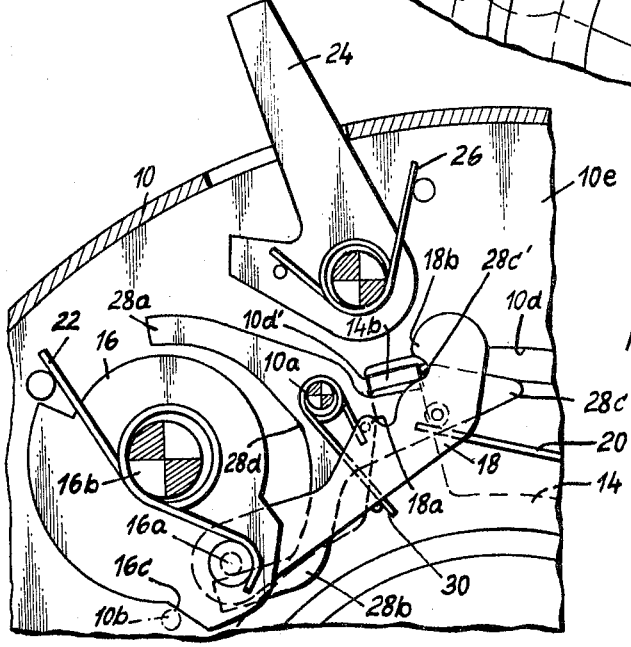

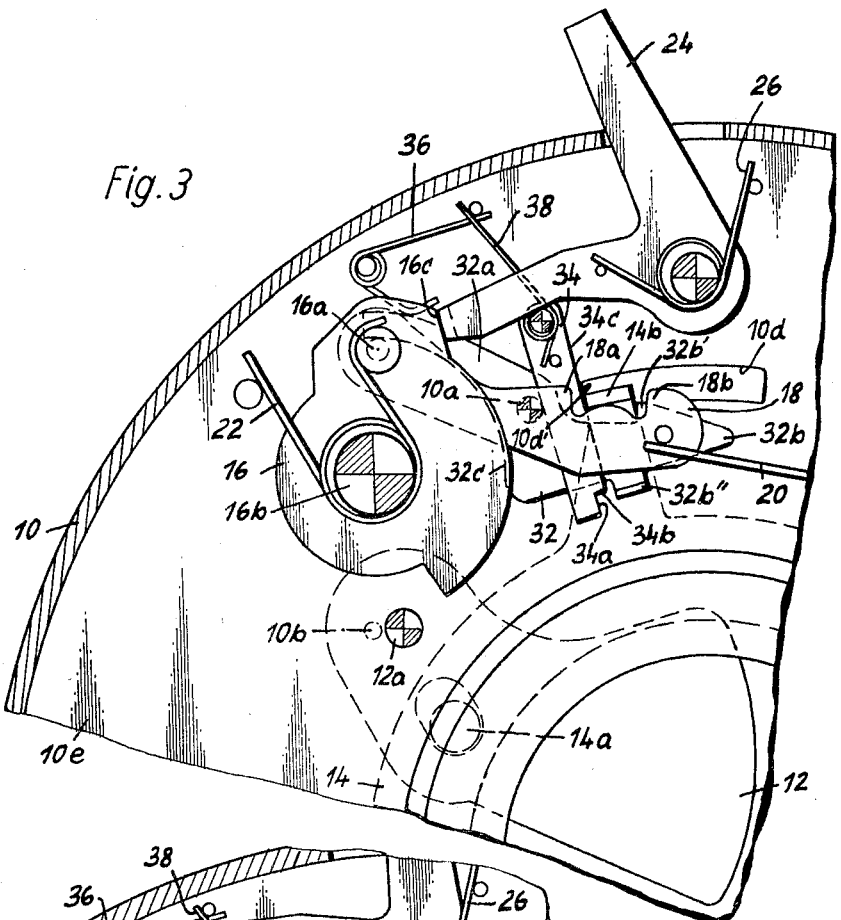
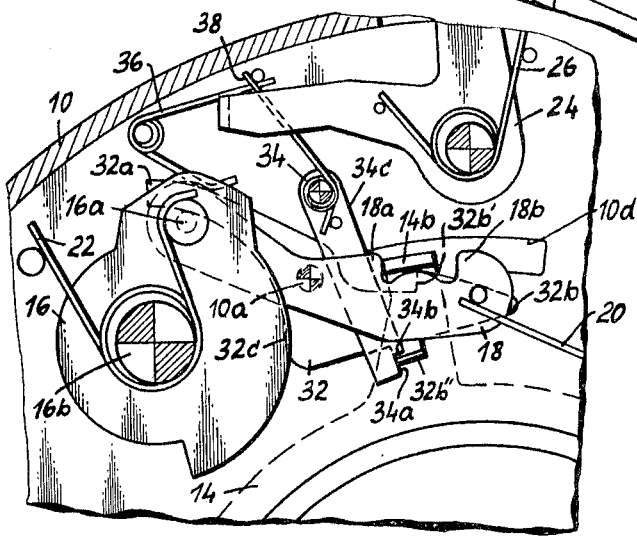

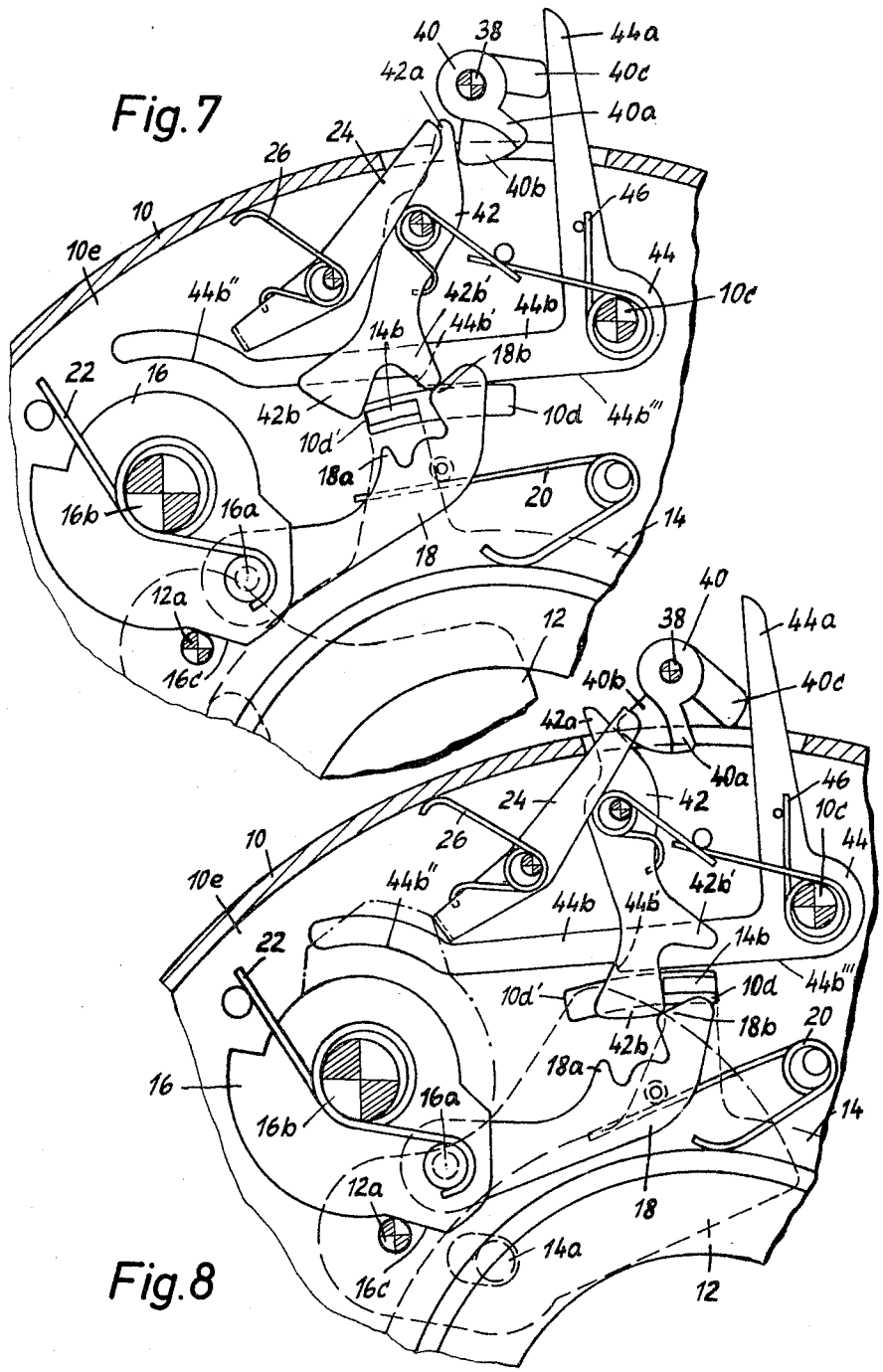

United States Patent Office

3,283,687
Patented Nov. 8, 1966

3,283,687
PHOTOGRAPHIC SHUTTER WITH MEANS FOR PREVENTING REBOUND OF THE BLADES
Franz Singer and Karl Härtl, Munich, Germany, assignors to Compur-Werk Gesellschaft mit beschrankter Haftung & Co.
Filed Nov. 30, 1964, Ser. No. 414,656
Claims priority, application Germany, Dec. 4, 1963, C 31,582
2 Claims. (Cl. 95—63)

This invention relates to a photographic shutter having a main driving member and a driving ring which opens and closes the shutter blades and to a means for preventing undesirable rebounding movement of the driving ring to open the shutter after an exposure has been made.

In photographic shutters of the type to which the present invention relates there is provided a main driving member which drives a ring to open and close the shutter. When the shutter moves to closed position the driving ring strikes a fixed abutment and there is a possibility that the force with which this abutment is struck will cause the driving ring to rebound, thus partially opening the shutter after the exposure is made. Obviously such rebounding is undesirable and the present invention provides a means which is simple in construction and yet effectively prevents such rebounding.

According to the present invention there is provided a locking lever which cooperates with a pin on the main driving member so that the locking lever is moved into a locking engagement with the driving ring when the shutter is closed. This locking engagement of the lever and ring prevents any rebounding movement of the driving ring. In one embodiment of the invention the locking lever is pivoted and spring urged in a locking position. The engagement of an arm of the lever with a pin on the main driving member prevents the locking lever from moving to the locking position thereof until the main driving member has rotated to the run down position.

In a further embodiment of the invention there is provided a safety lever which cooperates with the locking lever and prevents the locking lever from moving into the locking position until the driving ring has completed its movement into the shutter closed position.

In still another embodiment of the invention which is particularly useful in connection with single lens reflex cameras there is provided means for locking the shutter closed after the exposure and subsequently permitting the shutter to open for interim inspection. In this embodiment the locking lever is provided with a pair of arms one of which cooperates with the main driving member and the other of which cooperates with the operating shaft which rotates the mirror into and out of operative position.

An object of the present invention is to provide a mechanism for a photographic shutter which serves to prevent rebounding of the driving ring to open the shutter after an exposure has been made.

Another object of the present invention is to provide a locking lever for a photographic shutter which engages a member on the shutter driving ring and prevents a rebounding movement of the driving ring to a shutter open position after an exposure has been made.

Other objects and many of the attendant advantages of the present invention will become more readily apparent upon consideration of the following detailed specification in connection with the accompanying drawings wherein:

FIG. 1 is a plan view of part of a shutter in the cocked condition, with the front plate removed, FIGURE 2 illustrates this shutter in its rest position, FIGURES 3 and 4 illustrate another embodiment of the shutter in the cocked and tripped positions and, FIGURES 5 to 8 show another shutter construction in various operative conditions.

The shutter illustrated is a blade shutter of known form, the mechanisms of which are installed in a shutter housing 10. It has, for example, five shutter blades 12 of which only one has been illustrated for the sake of simplicity; each shutter blade is pivotally mounted at 12a and is given a reciprocatory movement for the purpose of opening and closing of the objective aperture by a driving pin 14a of a blade driving ring 14. The ring 14 is in turn driven by a main driving member 16 and a crank 18 which is pivotally coupled to the latter by a pin 16a and which co-operates with the upwardly-bent end of an arm 14b of the blade driving ring 14. The arm 14b of the ring 14 passes through a slot 10d of the base plate 10e being directed towards the front and in its rest position bears against an abutment 10d' of the slot 10d. The crank 18 has two crank arms 18a and 18b and a spring 20 urges the crank 18 into engagement with the arm 14b of the blade driving ring 14. The main driving member 16 has a cocking shaft 16b which projects rearwardly out of the shutter housing and a driving spring 22 which biases the main driving member in the clockwise direction. In the cocked condition illustrated FIGURE 1 the main driving member is held stationary by a trip lever 24 which is subject to the action of a spring 26.

A three-armed locking lever 28 is rotatably mounted on a fixed pin 10a an orientating spring 30 being associated therewith and biasing the same in the counterclockwise direction and against the part 16a. The locking lever 28 is so formed that its first arm 28a and its second arm 28b co-operate with the rearwardly-extended pin 16a of the main driving member 16 while its third arm 28c has a locking nose 28c" which can be brought into engagement with the arm 14b of the blade driving ring.

The shutter described operates as follows:

On operation of the trip lever 24 the loaded main driving member 16 moves under the compulsion of its spring 22 from the cocked position illustrated in FIGURE 1, in the clockwise direction and towards its rest position shown in FIGURE 2, this latter being defined by a fixed abutment pin 10b against which the nose 16c of the main driving member is applied. During this run down movement of the main driving member 16 the crank 18 is first moved to the right, its arm 18a moving the arm 14b of the blade ring in the clockwise direction so as to open the shutter blades 12. In the second phase of this run down movement of the main driving member the crank 18 is moved to the left, its other arm 18b now moving the arm 14b of the blade driving ring 14 in the counterclockwise direction so as to close the blades as the driving member moves into the rest position shown in FIGURE 2. During this run down movement of the main driving member towards the rest position, the pin 16a thereof slides over a face 28d of the locking lever 28 which is of arcuate form, this lever retaining the position thereof illustrated in FIGURE 1. It is not until the end of the run down movement of the main driving member and when the rest position (the closed blade position) is reached that the pin 16a engages the arm 28b of the locking lever so as to permit the locking lever to pivot in the counterclockwise direction. The locking nose 28c' of the locking lever arm 28c takes up a position in front of the arm 14b (FIGURE 2) so that any oscillatory bounce of the blade driving ring 14 between the abutment 10d' and the crank arm 18b, as a consequence of the very forcible action of the driving spring 22 is prevented and further light passing through the shutter is thus avoided.

When the main driving member 16 is re-cocked by its shaft 16b, which may, for example, be coupled to the film feed gear of the camera in known manner, the main driving member moves in the counterclockwise direction into the cocked position. Due to the fact that the crank arm 18a is in its rest position out of engagement with and in front of arm 14b (as FIG. 2 clearly shows), a movement of the crank 18 towards the right during the first phase of the cocking movement will not affect the arm 14b of the blade driving ring 14. Moreover, the crank arm 18a slides past the inner surface of the arm 14b directed towards the center of the shutter under the action of the spring 20, a further spring (not shown) retaining the blade driving ring in its rest position. In the initial phase of the cocking movement referred to above, the pin 16a of the main driving member simultaneously moves away from the arm 28b of the locking lever 28 and slides into engagement with operating surface 28d, whereby the locking lever 28 will move in the clockwise direction against the action of its spring 30. This breaks the locking engagement between the nose 28c' of the locking lever arm 28c and the arm 14b of the blade driving ring, so that the locking lever 28 re-assumes the position thereof illustrated in FIGURE 1. During the second phase of the cocking movement the crank 18 again moves to the left until it re-assumes the position illustrated in FIGURE 1.

FIGURES 3 and 4 illustrate a somewhat modified embodiment of the locking means. The parts thereof corresponding to those shown in FIGURES 1 and 2 have been given like reference numerals. In contrast to the first example the locking lever 32 now has a safety lever associated therewith. The cocking lever 32 is in the form of a double-armed lever, including an arm 32a, and an arm 32b with a nose 32b' and a shoulder 32". The locking lever 32 is rotatably mounted on a pin 10a and a spring 36 biases the same in the counterclockwise direction. The safety lever 34 is a single-armed lever having an abutment surface 34a a nose 34b and a setting spring 38 which urges the safety lever 34 in the counterclockwise direction and into a position in which the side face 34c thereof bears against the arm 14b of the main driving ring 14.

FIGURE 3 shows the shutter in the cocked condition. After the trip lever 24 has been operated the main driving member 16 begins to run down towards its rest position. The opening and closing of the shutter blades 12 is performed in the same way as in the preceding example so that the details of this need not be described here. Only the function of the two levers 32, 34 will be referred to in detail. At the start of the opening movement of the blade driving ring 14 in the clockwise direction, the safety lever 34 accompanies the arm 14b until its abutment face 34a meets the shoulder 32b" of the locking lever 32 which prevents further movement (FIGURE 4) of the safety lever. At the same time the nose 34b of the safety lever 34 engages beneath the shoulder 32b" of the locking lever 32 so that when the lever 32 is released by the main driving member 16 it is prevented from moving in the counterclockwise direction. This release of the locking lever 32 is initiated when the pin 16a is displaced from the arcuate operating surface 32c of the locking lever 32 when the main driving member runs down, and subsequently when during the rearward movement of the blade driving ring into its closure or rest position, the arm 14b thereof makes contact with the lateral face 34c of the safety lever 34 shortly before reaching its end position, whereby this lever 34 is positively moved in the clockwise direction. As a result of this, the locking engagement between the levers 32, 34, at 34b, 32b" is broken, the locking lever 32 now moving in the counterclockwise direction in apposition to the action of its spring 36 with the result that the nose 32b' of the locking lever arm 32b takes up a position in front of the arm 14b of the blade driving ring 14 and again prevents oscillatory bounce of the blade ring.

When the main driving member 16 is again moved in the counterclockwise direction for cocking the pin 16a thereof engages the operating surface 32c of the locking lever 32 so that during the further progress of this cocking movement the locking lever 32 is moved in the clockwise direction through its arm 32a, until this re-assumes the position of FIGURE 3. In this condition the locking engagement is broken between the nose 32b' of the lever arm 32b and the arm 14b of the blade driving ring.

A further embodiment of the bounce eliminating means is illustrated in FIGURES 5 to 8. This is concerned with an advantageous arrangement of the locking means on a shutter with a supplementary opening arrangement, for example, in the case of a single lens reflex camera having a quick or instantaneous return of the reflex mirror. To enable this shutter to be used with cameras of this type the latter are provided with an opening shaft 38 which is adapted to be coupled to the gear of the reflex control which is disposed within the camera. Fixed on this shaft 38 is a sleeve 40 having three radial arms 40a, 40b and 40c disposed in different planes. The first arm 40a of this sleeve co-cooperates with the shutter trip lever 24, while the second arm 40b co-acts with an arm 42b of a double-arm transmission lever 42. The other arm 42b and projection 42b' of this lever 42 co-operates with the crank 18 and the arm 14b of the blade driving ring 14. The third arm 40c of the sleeve 40 co-operates with the arm 44a projecting out of the shutter housing, of a bell-crank locking lever 44 which is rotatable on the pin 10c and is biased by a spring 46 in the counterclockwise direction. The arm 44b of this locking lever 44 has a nose 44b' and an operating surface 44b" which co-act with the pin 16a of the main driving member 16.

Figure 6:
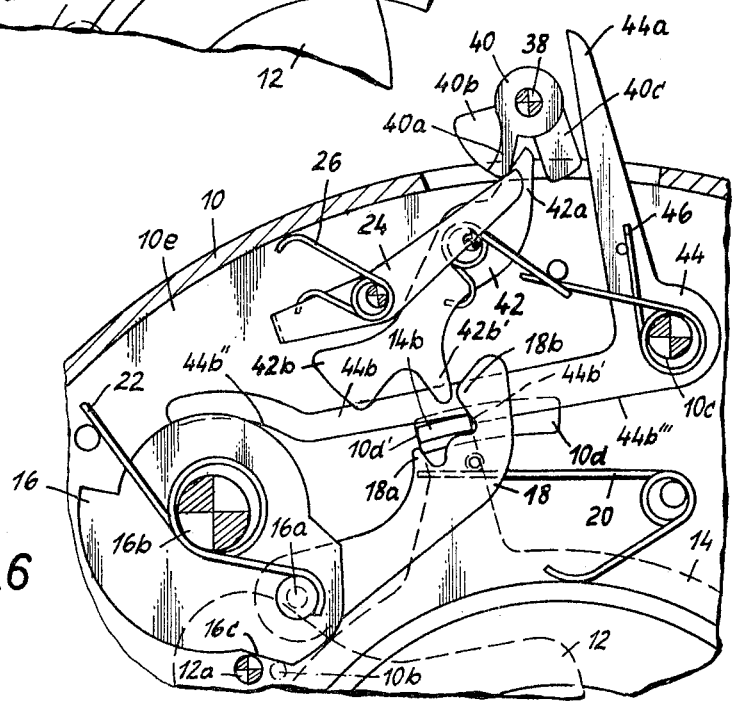

The operation of this last-described construction of the shutter is as follows:

In FIGURE 8 the shutter blades 12 are shown open for interim inspection and the main driving member has a cocked position which has been indicated in dotted lines. Before exposure the blades must be brought back from this open position into their closed position. This is performed by actuating the camera trip (not shown) allows the shaft 38 and the sleeve 40 to run down in the counter clockwise direction from the position illustrated in FIGURE 8. At the commencement of this run down movement the arm 40b of the sleeve 40 moves gradually out of engagement with the arm 42a of the transmission lever 42 which moves in the clockwise direction into the position shown in FIGURE 5. As a result its other arm 42b allows the blade driving ring 14, through its arm 14b, to run back into the closure position of FIGURE 5, thereby closing the shutter. The arm 42b or the projection 42b' of the transmission lever 42 has also released the crank 18 so that it can engage the arm 14b of the blade driving ring 14. At the end of the aforesaid run down movement of the shaft 38 the arm 40a of the sleeve 40 contacts the trip lever 24 whereby the latter is pivoted in the clockwise direction to free the main driving member 16 so that it can run down (FIGURE 5). The exposure is now carried out by opening and closing the shutter blades in the manner which has been described above. At the beginning of the movement of the main driving member 16 towards its rest position, the pin 16a thereof separates from the operating surface 44b" of the locking lever arm 44b. As a result the locking lever 44 is moved only slightly in the counterclockwise direction under the action of its spring 46 until lateral surface 44b''' bears against the arm 14b of the blade driving ring 14. When the blade driving ring 14 runs back into the closure position, the arm 14b slides along the lateral surface 44b''' and does not shift the position of locking lever 44 until shortly before reaching its end position. At the end position of arm 14b the locking lever 44 pivots further in the counter clockwise direction to a position where the nose 44b' thereof is disposed behind the arm 14b (FIGURE 6).

Since, as pointed out hereinbefore, we are here dealing with a camera having a quick or instantaneous return of the reflex mirror, the opening shaft 38 and sleeve 40 turn further in the clockwise direction after a picture has been taken. After a pre-determined angular rotation the arm 40c of the sleeve 40 engages the arm 44a of the locking lever 44 and moves it in the clockwise direction, so that the locking engagement is broken between the nose 44b' of the locking lever arm 44b and the arm 14b of the blade driving ring 14. During the further progress of this rotary movement of the shaft 38 the arm 40b of the sleeve 40 engages the arm 42a of the transmission lever 42, causing the latter to be pivoted positively in the counter clockwise direction. This brings the projection 42b' of the lever arm 42b into engagement with the crank 18, so that the latter is moved in the clockwise direction and out of engagement with the arm 14b of the blade driving ring. After the locking engagement has been broken the arm 42b of the locking lever 42 also engages the arm 14b, so that the ring 14 moves until the blades of the shutter open and are held in this condition (FIGURE 8). In the meantime the projection 42b' has moved away from the crank arm 18b and is replaced by the arm 42b of the transmission lever 42, whereby engagement continues to be prevented between the crank 18 and the arm 14b. When a fresh picture is to be taken, it is now only necessary to cock the shutter again, this being performed by rotation of the main driving member 16 by means of its shaft 16b which for example may be coupled in known fashion to the film feed and reflex mirror gear of the camera. During the cocking of the main driving member 16 in the counter clockwise direction the pin 16a thereof engages the operating surface 44b'' of the locking lever arm 44b and the result of this is that the locking lever 44, after it has been released by the arm 40c of the sleeve 40 during the tripping of the camera cannot immediately move in the counterclockwise direction.

The means according to the invention for restraining the bounce of the blade driving ring has the advantage that, in the closure position of the blade driving ring, the latter is prevented from making any oscillatory rebounding movement after an exposure has been made. The release of the means restraining this rebounding movement has the same positive dependence on the main driving member as the blade driving ring so that as a result there is a positive and certain movement of the shutter blades, and consequently undesirable exposure of the film to light after an exposure is avoided.

What is claimed is:

1. In a photographic shutter of the class described, a housing, shutter blades pivotally mounted in said housing, a driving ring operatively connected to said shutter blades so as to be reciprocable to open and close the shutter blades, an arm on said driving ring, a main driving member rotatable in said housing, a crank connecting the main driving member and the arm on said ring whereby upon rotation of the driving member the driving ring is reciprocated to open and close the shutter blades, a mirror controlling shaft rotatable with respect to said housing, a locking lever pivotally mounted in said housing, a locking shoulder on said lever engageable with the arm on said ring, said locking lever having a pair of arms, one of said arms being engageable with said main driving member, the other of said arms being engageable with the operating shaft, a shutter trip lever pivoted in said housing and having one end portion engageable with the operating shaft and the other end portion engageable with the main driving member, and a transmission lever pivoted in said housing, said transmission lever having one end portion engageable with said operating shaft and the other end portion engageable with said crank whereby said locking lever engages said arm on the main driving ring after the shutter hash been opened and closed by the main driving member to prevent rebounding movement of the driving ring, and the locking lever and crank may be disengaged from said arm on the driving ring to permit the shutter to be opened for interim inspection.

2. In a photographic shutter of the class described, a housing, shutter blades pivotally mounted in said housing, a driving ring operatively connected to said shutter blades so as to be reciprocable to open and close the shutter blades, an arm on said driving ring, a main driving member rotatable in said housing, a crank connecting the main driving member and the arm on said ring whereby upon rotation of the driving member the driving ring is reciprocated to open and close the shutter blades, a locking lever pivotally mounted in said housing, a locking nose on said locking lever engageable with said arm on the driving ring, a pin on said main driving member, spring means urging said locking lever into engagement with said arm on the driving ring, said pin engaging said locking lever and preventing movement of said locking lever into locking position with the driving ring in the cocked position of the main driving member whereby when the main driving member moves to an uncocked position the pin and locking lever are disengaged and the spring means moves said locking lever into locking engagement with the arm of the driving ring to prevent rebounding movement of the driving ring after the shutter blades have been opened and closed and further including a safety lever pivoted in said housing, a locking shoulder on said safety lever, one face of said safety lever being engageable with the arm on said driving ring, spring means urging said safety lever into engagement with said arm, said locking shoulder engaging said locking lever and preventing movement of said locking lever to the locking position thereof while the arm is moving said shutter blades.

References Cited by the Examiner
UNITED STATES PATENTS

| 1,049,379 | 1/1913 | Marks | 95—63 |
|-----------|--------|-------|-------|
| 1,629,534 | 5/1927 | Riddell | 95—63 |

OTHER REFERENCES 1,777,183, April 1958, German Utility Patent.

JOHN M. HORAN, *Primary Examiner.*